No. 657,646. Patented Sept. 11, 1900.
G. B. CRUICKSHANK, H. R. S. COLEMAN & P. CRUICKSHANK.
APPARATUS FOR RECLAIMING TIN AND ZINC FROM TINNED AND ZINC SCRAP.
(Application filed May 23, 1900.)

(No Model.) 2 Sheets—Sheet 1.

Witnesses
Ernest W. Jones
C. Hayward Powell

Inventors
George B. Cruickshank
Herbert R. S. Coleman
Percival Cruickshank
PER Charles J. Powell
ATTORNEY

THE NORRIS PETERS CO., PHOTO-LITHO., WASHINGTON, D. C.

No. 657,646. Patented Sept. 11, 1900.
G. B. CRUICKSHANK, H. R. S. COLEMAN & P. CRUICKSHANK.
APPARATUS FOR RECLAIMING TIN AND ZINC FROM TINNED AND ZINC SCRAP.
(Application filed May 23, 1900.)
(No Model.) 2 Sheets—Sheet 2.
FIG 2
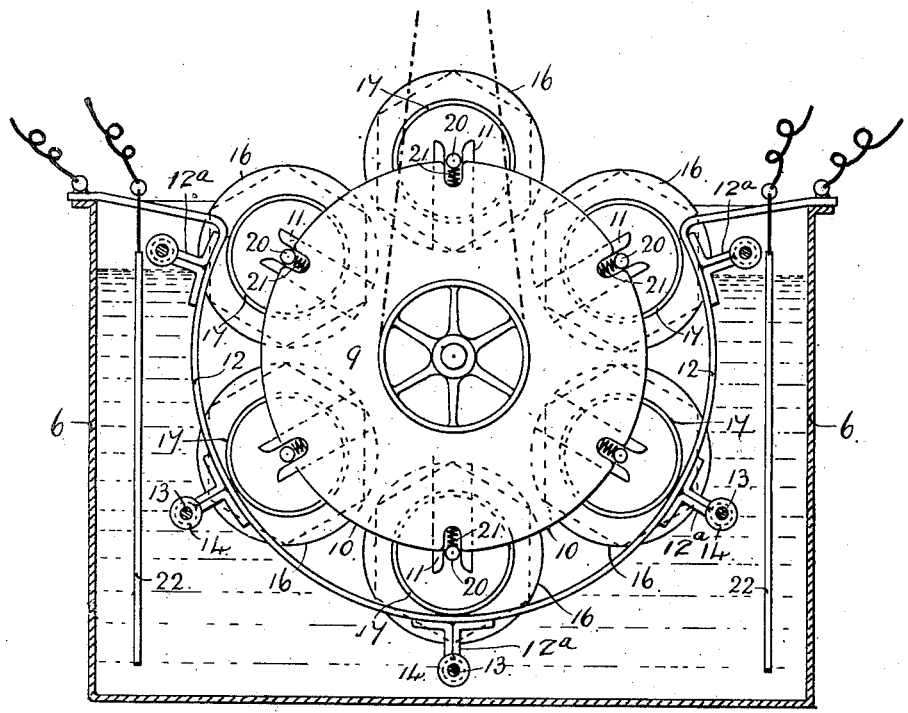
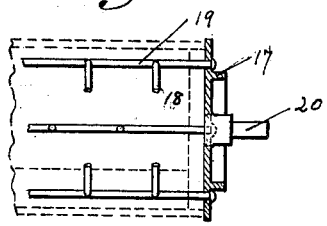
Fig. 4.
Witnesses
Inventors
GEORGE B. CRUICKSHANK.
HERBERT R. S. COLEMAN.
PERCIVAL CRUICKSHANK.
PER Charles J. Powell
ATTORNEY.

United States Patent Office.

GEORGE BERRELL CRUICKSHANK, OF BIRMINGHAM, HERBERT ROBERT STODDARD COLEMAN, OF SMETHWICK, AND PERCIVAL CRUICKSHANK, OF BIRMINGHAM, ENGLAND.

APPARATUS FOR RECLAIMING TIN AND ZINC FROM TINNED AND ZINC SCRAP.

SPECIFICATION forming part of Letters Patent No. 657,646, dated September 11, 1900.

Application filed May 23, 1900. Serial No. 17,768. (No model.)

*To all whom it may concern:*

Be it known that we, GEORGE BERRELL CRUICKSHANK, residing at 121 Camden street, in the city of Birmingham, HERBERT ROBERT STODDARD COLEMAN, residing at 118 Sycamore road, Smethwick, in the county of Stafford, and PERCIVAL CRUICKSHANK, residing at 121 Camden street, in the city of Birmingham, England, subjects of the Queen of Great Britain, have invented new and useful Improvements in Apparatus for Reclaiming Tin and Zinc from Tinned and Zinc Scrap, (for which we have made application for patent in Great Britain under No. 7,447, bearing date April 23, 1900,) of which the following is a specification.

Our invention relates to improvements in apparatus for reclaiming tin and zinc from tinned and zinc scrap; and its objects are to provide an improved arrangement of circumferential revoluble anode-drums carried upon a revoluble reel which is partly immersed in solution; also, to provide mechanism whereby the circumferential anode-drums shall be revolved by frictional rolling contact upon a prepared pathway; also, to provide such pathway with open upper part and the bearings carrying the drums with open ends to permit of ready removal and replacing of drums. We attain these objects by the mechanism illustrated in the accompanying drawings, in which—

Figure 1:
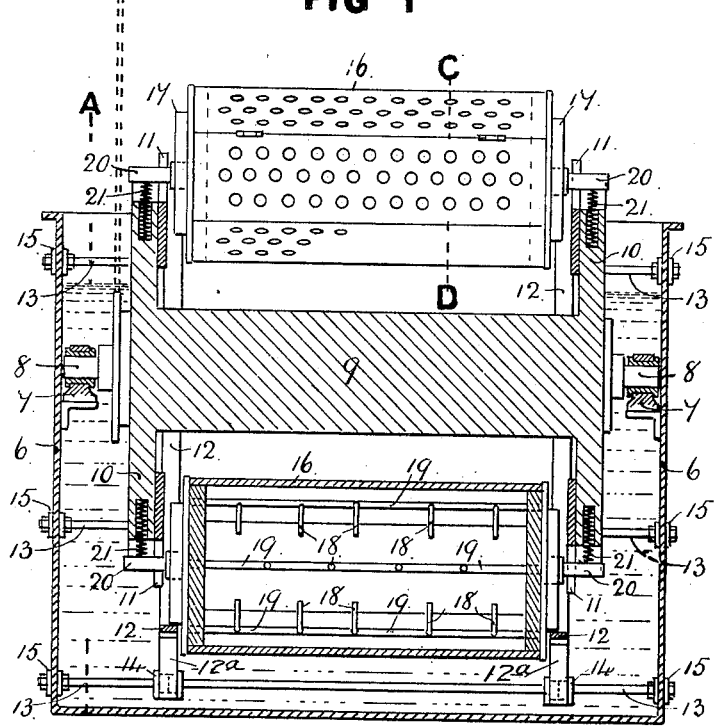
Figure 3:
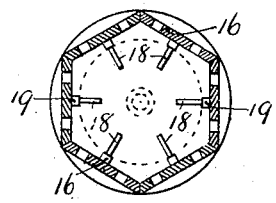

Figure 1 is a longitudinal general sectional view in elevation of the invention. Fig. 2 is a transverse sectional view of the invention on line A B, Fig. 1. Fig. 3 is a cross-sectional view of one of the anode-drums on line C D, Fig. 1. Fig. 4 is an enlarged detail view showing electrical connections from end of drum to anodes.

To the sides of the vat 6 we secure bearings 7 to support shaft-journals 8. The said journals 8 are secured to the reel 9, having flanges 10, upon which are carried the bearings 11. Concentric with the reel the metallic pathways 12, usually of copper, are carried by means of cross-rods 13, which are screwed at their ends to the sides of the vat, the said rods passing through the insulating-blocks 14, which are fixed in the brackets 12ª, the latter being riveted or otherwise secured to the pathway 12. The rods 13 are also preferably insulated from the vat by blocks 15.

16 indicates the anode-drums, within which is placed the tinned or zinc scrap as anodes, the said drums being provided with the usual doorway for access to the interior. At the ends of the drums are fixed the metallic rings 17, which frictionally roll upon the pathways 12, and thereby give a revolving motion to the drums. These drums may be made with wooden ends, while the cylindrical cover of the body is of perforated metal, with metallic connection to the rings 17, thereby giving electrical contact to the anodes (tinned scrap) in the drums. The metallic rings 17, rolling upon the insulated metallic pathways 12, also afford the electrical connections for the current to the anodes (tinned and zinc scrap) in the drums, such connections being further completed by means of the metallic projections 18 and rods 19, being connected up to the said rings 17 by reason of their ends touching the said rings, as seen in Fig. 4, or they may, if desired, be riveted thereto. Beneath the journals 20 of the anode-drums springs 21 are employed, which exert pressure thereon to insure electrical and frictional contact. The pathway 12 continues only for a given portion of the circle—that is, having an upper open part, so that as the drums reach such open part they may be removed for discharge and other recharged ones replaced, and inasmuch as the speed of revolving is slow such removals and replacements may be done without stoppage of the reel.

22 indicates the cathodes, of which more may be added as required.

It will be obvious that any of the ordinary solutions may be used in the vat, such as caustic soda, caustic potash, or the like, or solutions of sulfuric, nitric, or hydrochloric acids. Such solutions may be heated or otherwise, as desired, by any suitable means. By these means the tin or zinc upon the scrap is decomposed, and, as is well known, adherence to the cathodes is prevented by the extra strong current to that required for ordinary plating, and a spongy deposit is the result, which may be readily removed, the majority of which would therefore be precipitated to the bottom of the vat as a black metallic powder, which would be subsequently treated in any well-known manner.

What we claim as our invention, and desire to secure by Letters Patent, is—

1. In apparatus for reclaiming tin or zinc from tinned or zinc scrap by the use of a chemical solution and electricity, the combination of the vat 6, having suspended therein the revoluble reel 9, with flanges 10, carried in bearings 7, with the circumferential revoluble perforated anode-drums 16, journaled at 11, such drums and their interiors being connected to the positive pole of a battery or dynamo, and the cathode-plates 22, connected to the negative pole of a battery or dynamo, all substantially as set forth and shown upon the drawings.

2. In apparatus for reclaiming tin or zinc from tinned or zinc scrap, by the use of a chemical solution and electricity the combination of the vat 6, having suspended therein the revoluble reel 9, having flanges 10 carrying perforated drums 16, in bearings 11, pressure-springs 21, said drums having rings 17 metallically and electrically connected to anodes and of the metallic pathway 12, insulated from tank but electrically connected to the positive pole of a battery or dynamo, with the cathode-plates 22, all substantially as set forth and shown.

GEORGE BERRELL CRUICKSHANK.
HERBERT ROBERT STODDARD COLEMAN.
PERCIVAL CRUICKSHANK.

Witnesses:
ERNEST W. JONES,
C. HAYWARD POWELL.